United States Patent
Fan et al.

(10) Patent No.: US 12,528,706 B2
(45) Date of Patent: Jan. 20, 2026

(54) METHOD FOR DEEP DESILICONIZATION OF COAL ASH AND RECOVERY OF SILICON RESOURCES

(71) Applicant: Huaneng Clean Energy Research Institute, Beijing (CN)

(72) Inventors: Jinhang Fan, Beijing (CN); Dongfang Guo, Beijing (CN); Shiqing Wang, Beijing (CN); Lianbo Liu, Beijing (CN); Shiwang Gao, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 709 days.

(21) Appl. No.: 18/052,306

(22) Filed: Nov. 3, 2022

(65) Prior Publication Data
US 2023/0091871 A1 Mar. 23, 2023

Related U.S. Application Data

(63) Continuation of application No. PCT/CN2021/114223, filed on Aug. 24, 2021.

(30) Foreign Application Priority Data

Aug. 26, 2020 (CN) .......................... 202010872850.6

(51) Int. Cl.
*C01B 33/24* (2006.01)
*B09B 3/35* (2022.01)
*B09B 3/40* (2022.01)

(52) U.S. Cl.
CPC ................ *C01B 33/24* (2013.01); *B09B 3/35* (2022.01); *B09B 3/40* (2022.01)

(58) Field of Classification Search
None
See application file for complete search history.

(56) References Cited

U.S. PATENT DOCUMENTS

2015/0299040 A1* 10/2015 Nelson ...................... C04B 7/02
106/771

FOREIGN PATENT DOCUMENTS

| CN | 107758714 A | * 3/2018 | ............. C01D 15/08 |
| CN | 108821299 A | * 11/2018 | ............. C01B 33/24 |

OTHER PUBLICATIONS

English translation of CN-108821299-A Description. (Year: 2018).*
English translation of CN-107758714-A Description. (Year: 2018).*
Zhao, P., et al. The heavy metal leaching property and cementitious material preparation by treating municipal solid waste incineration fly ash through the molten salt process. Waste Management & Research 2020, vol. 38(1) 27-34. (Year: 2019).*
WIPO, International Search Report for PCT/CN2021/114223, Sep. 29, 2021.

* cited by examiner

*Primary Examiner* — Anthony J Zimmer
*Assistant Examiner* — Zachary John Baum
(74) *Attorney, Agent, or Firm* — Hodgson Russ LLP

(57) ABSTRACT

A method for deep desiliconization of coal ash and recovery of silicon resources includes: ball-milling and drying decarburized coal ash; adding calcium oxide into a salt to obtain a mixture, and heating the mixture to a molten state under an inert atmosphere to obtain a molten salt, a molar ratio of the calcium oxide to the salt ranging from 0.5% to 18%; placing the ball-milled and dried coal ash into the molten salt, performing reaction under an atmospheric pressure, separating a reaction product from the molten salt, cooling the separated reaction product under an inert atmosphere, washing the cooled reaction product and drying the washed reaction product to obtain desiliconized coal ash; and cooling the molten salt under an inert atmosphere, washing the cooled salt and filtering the washed salt to recover calcium silicate and a filtrate.

17 Claims, No Drawings

METHOD FOR DEEP DESILICONIZATION OF COAL ASH AND RECOVERY OF SILICON RESOURCES

CROSS-REFERENCE TO RELATED APPLICATIONS

This application is a continuation application of International Application No. PCT/CN2021/114223, filed Aug. 24, 2021, which claims priority of Chinese Patent Application No. 202010872850.6, filed Aug. 26, 2020, the entire disclosures of which are incorporated herein by reference.

FIELD

The present disclosure belongs to the field of resource recovery of coal ash, and in particular to a method for deep desiliconization of coal ash and recovery of silicon resources.

BACKGROUND

Coal ash is a major solid waste discharged from coal-fired power plants, its large accumulation not only occupies land, resulting in a waste of land resources, but also heavy metals contained therein will pollute soil and water resource, thereby endangering human life, health and safety. Therefore, it is of great significance to develop harmless treatment as well as resource recovery and utilization for the coal ash.

The main components of the coal ash are metal oxides, unburned carbon and trace elements, in which the metal oxides are mainly composed of aluminum oxide, silicon oxide, ferric oxide, calcium oxide, magnesium oxide and titanium dioxide. Due to the high content of alumina in the coal ash, most of the current resource recovery and utilization technologies for the coal ash focus on the recycle of alumina. A high ratio of aluminum to silicon (also referred to as aluminum-silicon ratio) in the coal ash has an important effect on efficient aluminum extraction, and an effective pre-desiliconization system can not only improve the aluminum-silicon ratio and thus improve the economy of the alumina recovery process, but also contribute to the efficient recovery of silicon resources.

Silicon elements in the coal ash mainly exist in amorphous silicon dioxide and mullite crystals. Most of the current processes and systems use an alkali lye to pre-desiliconize the coal ash to remove the amorphous silicon dioxide. However, a large amount of silicon elements still stably exist in the mullite crystals, so the aluminum-silicon ratio in the coal ash needs to be further improved. Therefore, the development of a deep desiliconization technology and system for the coal ash is of great significance to improve the economy of coal ash recovery and accelerate its resource utilization. In addition, effective recovery of silicon resources during the desilication of the coal ash can further improve the economy of the whole process.

SUMMARY

Embodiments of the present disclosure provide a method for deep desiliconization of coal ash and recovery of silicon resources. The method includes: ball-milling and drying decarburized coal ash; adding calcium oxide into a salt to obtain a mixture, and heating the mixture to a molten state under an inert atmosphere to obtain a molten salt, a molar ratio of the calcium oxide to the salt ranging from 0.5% to 18%; placing the ball-milled and dried coal ash into the molten salt, performing reaction under an atmospheric pressure, separating a reaction product from the molten salt, cooling the separated reaction product under an inert atmosphere, washing the cooled reaction product and drying the washed reaction product to obtain desiliconized coal ash; and cooling the molten salt under an inert atmosphere, washing the cooled salt and filtering the washed salt to recover calcium silicate and a filtrate.

DETAILED DESCRIPTION

In order to solve the problems existing in the related art, the present disclosure provides a method for deep desiliconization of coal ash and recovery of silicon resources, which does not use an alkali lye, can effectively improve the desiliconization efficiency of the coal ash and improve the aluminum-silicon ratio in the desiliconized coal ash. At the same time, silicon elements can be recovered in a form of silicate to realize the effective recovery and utilization of silicon resources.

In order to achieve the above objects, embodiments of the present disclosure provide a method for deep desiliconization of coal ash and recovery of silicon resources. The method includes: ball-milling and drying decarburized coal ash; adding calcium oxide into a salt to obtain a mixture, and heating the mixture to a molten state under an inert atmosphere to obtain a molten salt, a molar ratio of the calcium oxide to the salt ranging from 0.5% to 18%; placing the ball-milled and dried coal ash into the molten salt, performing reaction under an atmospheric pressure, separating a reaction product from the molten salt, cooling the separated reaction product under an inert atmosphere, washing the cooled reaction product and drying the washed reaction product to obtain desiliconized coal ash; and cooling the molten salt under an inert atmosphere, washing the cooled salt and filtering the washed salt to recover calcium silicate and a filtrate.

In embodiments of the present disclosure, the decarburized coal ash is ball-milled at a rotating speed of 280 rpm to 320 rpm for 11 h to 13 h.

In embodiments of the present disclosure, the decarburized coal ash is ball-milled at a rotating speed of 280 rpm to 320 rpm for 12 h.

In embodiments of the present disclosure, the decarburized coal ash is ball-milled at a rotating speed of 300 rpm.

In embodiments of the present disclosure, the salt is a mixed salt of calcium chloride with at least one of sodium chloride, lithium chloride, magnesium chloride, potassium chloride and barium chloride.

In a specific embodiment, the salt is selected from $CaCl_2$ or a $CaCl_2$—NaCl mixed salt with a molar ratio of $CaCl_2$ to NaCl being 47.9:52.1.

In embodiments of the present disclosure, heating the mixture to the molten state includes: heating the mixture to a reaction temperature of 550° C. to 950° C.

In embodiments of the present disclosure, performing reaction under the atmospheric pressure includes: performing the reaction under the atmospheric pressure for 1 h to 15 h.

In embodiments of the present disclosure, the method further includes: subjecting the filtrate to evaporation and crystallization to recover the salt.

In embodiments of the present disclosure, an average particle size of the ball-milled coal ash ranges from 1 μm to 15 μm.

In embodiments of the present disclosure, heating the mixture to the molten state includes: heating the mixture to the molten state at a heating rate of 4° C./min.

In embodiments of the present disclosure, washing the cooled reaction product includes: washing the cooled reaction product with a mixture of water and dilute hydrochloric acid.

In embodiments of the present disclosure, an aluminum-silicon ratio in the desiliconized coal ash ranges from 2.8 to 20.5.

Compared with the related art, embodiments of the present disclosure at least have the following beneficial effects.

Ball-milling treatment can effectively reduce and homogenize the particle size of the coal ash, which can speed up the reaction rate of the coal ash with the molten salt in the subsequent thermochemical reaction and improve the desiliconization efficiency of the coal ash. Taking advantage of the reaction affinity between calcium oxide and silicon dioxide in the coal ash at high temperature and the high solubility of the resulting product in the molten salt, the silicon-containing reaction product can be transferred to the liquid molten salt, so as to realize the deep desiliconization of the coal ash. The coal ash after the deep desiliconization is directly removed from the molten salt, which can quickly realize solid-liquid separation and improve the recovery rate of the coal ash product after desiliconization. Further, as no alkali lye is used, the filtrate can be safely recovered at the same time, which does not pollute the environment. Moreover, the process is simple and easy to operate. In addition, the addition of calcium oxide can effectively improve the desiliconization efficiency of the coal ash, and increase the aluminum-silicon ratio in the desiliconized coal ash, which improves the economy of subsequent utilization of alumina. Furthermore, by cooling, washing and filtering the molten salt containing dissolved silicon-containing reaction product, the silicon-containing reaction product insoluble in water can be filtered and recovered, so as to realize the effective recovery of the silicon resources. Besides, by evaporation and crystallization of the filtrate, the molten salt can be recovered.

The method for deep desiliconization of coal ash and recovery of silicon resources provided by the present disclosure will be described in detail below with reference to the following examples, which, however, should not be construed as limiting the protection scope of the present disclosure.

Components and their contents of initial coal ash in all the examples below keep consistent; and the aluminum-silicon ratio in the initial coal ash is 1.02. The components of the initial coal ash are as follows:

| | Chemical components | | | | | |
|---|---|---|---|---|---|---|
| | $Al_2O_3$ | $SiO_2$ | $Fe_2O_3$ | $TiO_2$ | CaO | others |
| Mass percentage | 41.8% | 46.3% | 4.52% | 2.28% | 3.35% | 1.75% |

Example 1

The coal ash was weighed into a ball mill tank and ball-milled for 12 h at a rotating speed of 300 rpm. The ball-milled coal ash was placed in a high temperature resistant mesh bag to obtain a coal ash precursor.

500 g $CaCl_2$ was put into an alumina crucible, 5 mol % CaO was added, and they were placed in a graphite crucible as a whole to prevent liquid leakage from damaging the furnace. The use of the graphite crucible can consume oxygen in the furnace and regulate the atmosphere of the furnace. Under an argon atmosphere and a temperature of 250° C., the $CaCl_2$ was dried for 48 h, and then slowly heated to 850° C. with a heating rate of 4° C./min under the inert atmosphere to obtain a molten salt.

The coal ash precursor was placed into the molten salt, and slowly removed from the molten salt after reacting for 5 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 73.59 wt % alumina and 5.46 wt % silicon dioxide, and correspondingly has an aluminum-silicon ratio of 15.3.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 2

500 g $CaCl_2$ was put into an alumina crucible, 10 mol % CaO was added, and they were placed in a graphite crucible as a whole to prevent liquid leakage from damaging the furnace. The use of the graphite crucible can consume a certain amount of oxygen and regulate the atmosphere of the furnace. The $CaCl_2$ was dried for 48 h under a temperature of 250° C., and then slowly heated to 850° C. with a heating rate of 4° C./min under an argon atmosphere and the protection with cooling water, to obtain a molten salt.

The coal ash precursor was placed into the molten salt, and slowly removed from the molten salt after reacting for 5 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 74.63 wt % alumina and 4.13 wt % silicon dioxide, and correspondingly has an aluminum-silicon mass ratio of 20.5.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 3

500 g $CaCl_2$ was put into an alumina crucible, 12 mol % CaO was added, and they were placed in a graphite crucible as a whole to prevent liquid leakage from damaging the furnace. The use of the graphite crucible can consume oxygen in the furnace and regulate the atmosphere of the furnace. The $CaCl_2$ was dried for 48 h under a temperature of 250° C., and then slowly heated to 950° C. with a heating rate of 4° C./min under an argon atmosphere and the protection with cooling water, to obtain a molten salt.

The coal ash precursor was placed into the molten salt, and slowly removed from the molten salt after reacting for 1 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 74.08 wt % alumina and 4.83 wt % silicon dioxide, and correspondingly has an aluminum-silicon mass ratio of 17.4.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 4

500 g $CaCl_2$ was put into an alumina crucible, 18 mol % CaO was added, and they were placed in a graphite crucible as a whole to prevent liquid leakage from damaging the furnace. The use of the graphite crucible can consume oxygen in the furnace and regulate the atmosphere of the furnace. The $CaCl_2$ was dried for 48 h under a temperature of 250° C., and then slowly heated to 950° C. with a heating rate of 4° C./min under an argon atmosphere and the protection with cooling water, to obtain a molten salt.

The coal ash precursor was placed into the molten salt, and slowly removed from the molten salt after reacting for 8 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 75.43 wt % alumina and 3.09 wt % silicon dioxide, and correspondingly has an aluminum-silicon mass ratio of 27.7.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 5

500 g $CaCl_2$—NaCl (47.9:52.1, mol %) mixed salt was put into an alumina crucible, 0.5 mol % CaO was added, and they were placed in a graphite crucible as a whole to prevent liquid leakage from damaging the furnace. The use of the graphite crucible can consume a certain amount of oxygen and regulate the atmosphere of the furnace. The $CaCl_2$—NaCl mixed salt was dried for 48 h under a temperature of 250° C., and then slowly heated to 850° C. with a heating rate of 4° C./min under an argon atmosphere and the protection with cooling water, and kept at such a temperature for 0.5 h, and then cooled to a reaction temperature of 700° C. to obtain a molten salt.

The coal ash precursor was placed into the molten salt, and slowly removed from the molten salt after reacting for 5 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 59.18 wt % alumina and 23.98 wt % silicon dioxide, and correspondingly has an aluminum-silicon mass ratio of 2.8.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 6

500 g $CaCl_2$—NaCl (47.9:52.1, mol %) mixed salt was put into an alumina crucible, 3 mol % CaO was added, and they were placed in a graphite crucible as a whole to prevent liquid leakage from damaging the furnace. The use of the graphite crucible can consume a certain amount of oxygen and regulate the atmosphere of the furnace. The $CaCl_2$—NaCl mixed salt was dried for 48 h under a temperature of 250° C., and then slowly heated to 850° C. with a heating rate of 4° C./min under an argon atmosphere and the protection with cooling water, and kept at such a temperature for 0.5 h, and then cooled to a reaction temperature of 700° C. to obtain a molten salt.

The coal ash precursor was placed into the molten salt, and slowly removed from the molten salt after reacting for 10 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 70.51 wt % alumina and 9.41 wt % silicon dioxide, and correspondingly has an aluminum-silicon mass ratio of 8.5.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 7

The coal ash was weighed into a ball mill tank and ball-milled for 12 h at a rotating speed of 300 rpm. The ball-milled coal ash was placed in a high temperature resistant mesh bag.

500 g $CaCl_2$—NaCl mixed salt was put into an alumina crucible, 12 mol % CaO was added, and they were placed in a graphite crucible as a whole to prevent liquid leakage from damaging the furnace. The use of the graphite crucible can consume oxygen in the furnace and regulate the atmosphere of the furnace. Under an argon atmosphere and a temperature of 250° C., the $CaCl_2$—NaCl mixed salt was dried for 48 h, and then slowly heated to 550° C. with a heating rate of 4° C./min under the inert atmosphere to obtain a molten salt.

The coal ash precursor was placed into the molten salt, and slowly removed from the molten salt after reacting for 15 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 71.69 wt % alumina and 7.9 wt % silicon dioxide, and correspondingly has an aluminum-silicon ratio of 10.3.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recovery the molten salt.

Example 8

500 g $CaCl_2$—NaCl (47.9:52.1, mol %) mixed salt was put into an alumina crucible, 0.5 mol % CaO was added, and they were placed in a graphite crucible as a whole to prevent liquid leakage from damaging the furnace. The use of the graphite crucible can consume a certain amount of oxygen and regulate the atmosphere of the furnace. The $CaCl_2$—NaCl mixed salt was dried for 48 h under a temperature of 250° C., and then slowly heated to 850° C. with a heating rate of 4° C./min under an argon atmosphere and the protection with cooling water, and kept at such a temperature for 0.5 h, and then cooled to a reaction temperature of 650° C. to obtain a molten salt.

The coal ash precursor was placed into the molten salt, and slowly removed from the molten salt after reacting for 5 h. The reaction product was cooled to room temperature and then taken out of the mesh bag under an inert atmosphere. Afterwards, the reaction product was soaked repeatedly with deionized water and dilute hydrochloric acid (0.1 M), and subjected to ultrasound to remove residual molten salt, and then the reaction product was centrifuged, and finally vacuum dried at 80° C. for 2 h. The desiliconized coal ash obtained thereby contains 59.18 wt % alumina and 23.98 wt % silicon dioxide, and correspondingly has an aluminum-silicon mass ratio of 2.8.

The reacted molten salt was cooled to room temperature under an inert atmosphere, and soaked and filtered repeatedly with deionized water and dilute hydrochloric acid (0.1 M). The solid residue was vacuum dried at 80° C. for 2 h to obtain calcium silicate. The filtrate was subjected to evaporative crystallization to recover the molten salt.

The above description on some embodiments and examples of the present disclosure enables those skilled in the art to realize or implement the present disclosure. Various modifications to these embodiments and examples will be apparent to those skilled in the art, and the generic principles defined herein may be implemented in other embodiments without departing from the spirit or scope of the present disclosure. Therefore, the present disclosure is not limited to the embodiments or examples shown herein, but is intended to cover the widest scope consistent with the principles and novel features disclosed herein.

What is claimed is:

1. A method for deep desiliconization of coal ash and recovery of silicon resources, comprising:
    ball-milling and drying decarburized coal ash;
    adding calcium oxide into a salt to obtain a mixture, and heating the mixture to a molten state under an inert atmosphere to obtain a molten salt, a molar ratio of the calcium oxide to the salt ranging from 0.5% to 18%;
    placing the ball-milled and dried coal ash into the molten salt, performing reaction under an atmospheric pressure, separating a reaction product from the molten salt, cooling the separated reaction product under an inert atmosphere, washing the cooled reaction product and drying the washed reaction product to obtain desiliconized coal ash; and
    cooling the molten salt under an inert atmosphere, washing the cooled salt and filtering the washed salt to recover calcium silicate and a filtrate.

2. The method of claim 1, wherein the salt is a mixed salt of calcium chloride with at least one of sodium chloride, lithium chloride, magnesium chloride, potassium chloride and barium chloride.

3. The method of claim 1, wherein heating the mixture to the molten state comprises:
    heating the mixture to a reaction temperature of 550° C. to 950° C.

4. The method of claim 3, wherein performing reaction under the atmospheric pressure comprises:
    performing the reaction under the atmospheric pressure for 1 h to 15 h.

5. The method of claim 1, further comprising:
    subjecting the filtrate to evaporation and crystallization to recover the salt.

6. The method of claim 1, wherein an average particle size of the ball-milled coal ash ranges from 1 μm to 15 μm.

7. The method of claim 1, wherein heating the mixture to the molten state comprises:
    heating the mixture to the molten state at a heating rate of 4° C./min.

8. The method of claim 1, wherein washing the cooled reaction product comprises:
    washing the cooled reaction product with a mixture of water and dilute hydrochloric acid.

9. The method of claim 1, wherein an aluminum-silicon mass ratio in the desiliconized coal ash ranges from 2.8 to 20.5.

10. The method of claim 1, wherein ball-milling the decarburized coal ash comprises:
    ball-milling the decarburized coal ash at a rotating speed of 280 rpm to 320 rpm for 11 h to 13 h.

11. The method of claim 1, wherein the salt is $CaCl_2$.

12. The method of claim 2, wherein the mixed salt is a $CaCl_2$—NaCl mixed salt with a molar ratio of $CaCl_2$ to NaCl of 47.9:52.1.

13. The method of claim 1, wherein washing the cooled salt comprises:
    washing the cooled salt with a mixture of water and dilute hydrochloric acid.

14. The method of claim 1, wherein cooling the separated reaction product comprises:
    cooling the separated reaction product to room temperature.

15. The method of claim 1, wherein drying the washed reaction product comprises:
    drying the washed reaction product at 80° C. under vacuum.

16. The method of claim 1, wherein cooling the molten salt comprises:
    cooling the molten salt to room temperature.

17. The method of claim 1, wherein the inert atmosphere is an argon atmosphere.

* * * * *